United States Patent
Kim

(10) Patent No.: US 8,295,833 B2
(45) Date of Patent: Oct. 23, 2012

(54) TERMINAL PERFORMING CAMPING BASED ON IMSI INFORMATION AND CONTROL METHOD THEREOF

(75) Inventor: Noh-Sun Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 705 days.

(21) Appl. No.: 12/324,390

(22) Filed: Nov. 26, 2008

(65) Prior Publication Data

US 2009/0143023 A1    Jun. 4, 2009

(30) Foreign Application Priority Data

Dec. 4, 2007 (KR) .................. 10-2007-0124819

(51) Int. Cl.
  *H04W 60/00* (2009.01)
  *H04W 48/18* (2009.01)
(52) U.S. Cl. ............ 455/434; 455/433; 455/435.2
(58) Field of Classification Search ............ 455/433, 455/434, 435.1, 435.2, 450, 558, 432.1
  See application file for complete search history.

(56) References Cited

U.S. PATENT DOCUMENTS

| 7,260,394 B2 * | 8/2007 | Welnick et al. ............ 455/432.1 |
| 2004/0224689 A1 * | 11/2004 | Raghuram et al. .......... 455/435.3 |
| 2006/0160538 A1 * | 7/2006 | Hwang .................. 455/435.2 |
| 2006/0172735 A1 * | 8/2006 | Buckley et al. .............. 455/434 |
| 2007/0202875 A1 * | 8/2007 | Dorsey et al. ............... 455/434 |
| 2007/0275717 A1 * | 11/2007 | Edge et al. ................. 455/434 |
| 2009/0036123 A1 * | 2/2009 | Jeon ......................... 455/434 |
| 2010/0099412 A1 * | 4/2010 | Ramachandran et al. . 455/435.2 |

FOREIGN PATENT DOCUMENTS

WO    WO 2008141355 A1 * 11/2008

* cited by examiner

*Primary Examiner* — Howard Williams
(74) *Attorney, Agent, or Firm* — Jefferson IP Law, LLP

(57) ABSTRACT

A terminal and method are provided. The terminal includes an Absolute Radio Frequency Channel Number (ARFCN) table including at least one ARFCN information, and a controller for controlling a frequency scanning based on the ARFCN table to detect one or more ARFCNs from the ARFCN table and for controlling a camping on at least one of the detected one or more ARFCNs, such that the camping can be performed based on International Mobile Subscriber Identity (IMSI) information. The camping can be attempted without a scanning procedure for finding an available cell to reduce an amount of time for camping.

11 Claims, 3 Drawing Sheets

FIG. 1
(CONVENTIONAL ART)

| Operating Band | UL Frequencies UE transmit, Node B receive | DL Frequencies UE receive, Node B transmit |
|---|---|---|
| I | 1920 – 1980 MHz | 2110 –2170 MHz |
| II | 1850 –1910 MHz | 1930 –1990 MHz |
| III | 1710-1785 MHz | 1805-1880 MHz |
| IV | 1710-1755 MHz | 2110-2155 MHz |
| V | 824 – 849 MHz | 869-894 MHz |
| VI | 830-840 MHz | 875-885 MHz |

FIG. 2
(CONVENTIONAL ART)

| Band | Uplink (UL) UE transmit, Node B receive | | Downlink (DL) UE receive, Node B transmit | |
|---|---|---|---|---|
| | General | Additional | General | Additional |
| I | 9612 to 9888 | – | 10562 to 10838 | – |
| II | 9262 to 9538 | 12, 37, 62, 87, 112, 137, 162, 187, 212, 237, 262, 287 | 9662 to 9938 | 412, 437, 462, 487, 512, 537, 562, 587, 612, 637, 662, 687 |
| III | 8562 to 8913 | – | 9037 to 9388 | – |
| IV | 8562 to 8763 | 1162, 1187, 1212, 1237, 1262, 1287, 1312, 1337, 1362 | 10562 to 10763 | 1462, 1487, 1512, 1537, 1562, 1587, 1612, 1637, 1662 |
| V | 4132 to 4233 | 782, 787, 807, 812, 837, 862 | 4357 to 4458 | 1007, 1012, 1032, 1037, 1062, 1087 |
| VI | 4162 to 4188 | 812, 837 | 4387 to 4413 | 1037, 1062 |

TERMINAL PERFORMING CAMPING BASED ON IMSI INFORMATION AND CONTROL METHOD THEREOF

PRIORITY

This application claims the benefit under 35 U.S.C. §119(a) of a Korean patent application filed in the Korean Intellectual Property Office on Dec. 4, 2007 and there duly assigned Serial No. 10-2007-0124819, the entire disclosure of which is hereby incorporated by reference.

BACKGROUND OF THE INVENTION

1. Field of the Invention

The present invention relates to a terminal, which performs camping based on International Mobile Subscriber Identity (IMSI) information, and a control method thereof. More particularly, the present invention relates to a terminal, which performs camping based on IMSI information, and a control method thereof, which can minimize an amount of scanning for camping and can reduce an amount of time for camping.

2. Description of the Related Art

In the Universal Mobile Telecommunications System (UMTS), when a terminal is powered on or has moved into an area where mobile communication service is available from a first area in which mobile communication service was unavailable, the terminal performs frequency scanning across all frequency bands, which are supported by the system, in order to acquire the service.

Currently, available power scanning methods include three steps. Firstly, coarse scanning on respective frequency bands with a 2 MHz interval is performed. If energy is detected on some frequencies, fine scanning on detected Absolute Radio Frequency Channel Numbers (ARFCNs) with a 200 KHz interval is performed. Next, certain ARFCNs, from which energy of a specific level or more is detected, are acquired.

According to the conventional art, the frequency bands that a terminal scans in the UMTS include the Wideband Code Division Multiple Access (WCDMA) 1900 band and the WCDMA 850 band that are supported in the USA, and the WCDMA 2100 band that is supported in Europe.

For example, the WCDMA 2100 MHz (or 2.1 GHz) band has a 60 MHz bandwidth in the Down Link (DL) direction, designated with Operating Band I in FIG. 1.

FIG. 1 is a table illustrating allocated frequency bands according to the conventional art.

However, in the 60 MHz bandwidth, the terminal cannot locate an ARFCN, on which the terminal can camp, and thus the terminal has to scan all of the frequencies in the band.

FIG. 2 is a table illustrating allocatable ARFCNs according to the conventional art.

As illustrated in FIG. 2, the 60 MHz bandwidth has 277 available ARFCNs.

According to the conventional art, the scanning method is performed using the above-mentioned three steps, namely the course scanning, fine scanning and acquisition. Since the three steps of the scanning method are also performed on the 60 MHz bandwidth, there is problem in that a very long time is required to scan one band.

SUMMARY OF THE INVENTION

An aspect of the present invention is to address at least the above-mentioned problems and/or disadvantages and to provide at least the advantages described below. Accordingly, an aspect of the present invention is to provide a terminal, which performs camping based on International Mobile Subscriber Identity (IMSI) information, and a control method thereof, which can minimize an amount of scanning for camping and can also reduce an amount of time for camping.

In accordance with an aspect of the present invention, a terminal, which performs camping based on IMSI information, is provided. The terminal includes an Absolute Radio Frequency Channel Number (ARFCN) table including at least one ARFCN information, and a controller for controlling a frequency scanning based on the ARFCN table to detect one or more ARFCNs from the ARFCN table and for controlling a camping on at least one of the detected one or more ARFCNs, such that the camping can be performed based on International Mobile Subscriber Identity (IMSI) information.

The ARFCN table may identify the one or more ARFCNs based on at least one of Mobile Country Code (MCC) information and Mobile Network Code information stored in a Subscriber Identify Module (SIM) card.

The controller may control frequency scanning of all the ARFCNs included in the ARFCN table, if a camping does not occur on any ARFCN included in the ARFCN information, and controls frequency scanning of all frequency bands. The controller may add detected Public Land Mobile Network (PLMN) information as the ARFCN information of the ARFCN table after the frequency scanning of all the frequency bands.

The controller may control the frequency scanning when acquiring service after one of being powered on and moving into an area where the service is available from another area where the service is unavailable.

In accordance with another aspect of the present invention, a method of controlling a terminal, which has a Subscriber Identify Module (SIM) card is provided. The method includes determining whether frequency camping is attempted, if it is determined that the frequency camping is attempted, identifying preset Absolute Radio Frequency Channel Number (ARFCN) information stored in a SIM card, and camping on an ARFCN corresponding to the preset ARFCN information, such that the camping can be performed based on International Mobile Subscriber Identity (IMSI) information.

The determining of whether camping is attempted may be performed when the terminal attempts to acquire service after one of being powered on and moving into an area where the service is available from another area where the service is unavailable.

The preset AFRCN information may be included in an AFRCN table that is stored in the SIM card.

The identifying of the preset ARFCN information stored in the SIM card may be performed based on at least one of Mobile Country Code (MCC) and Mobile Network Code (MNC) information.

The identifying of the preset ARFCN information stored in the SIM card may comprise camping on a Home Public Land Mobile Network (HPLMN) and then camping on a Visitor Public Land Mobile Network (VPLMN).

The method may further include performing frequency scanning of all frequency bands if, after all AFRCNs identified through an ARFCN table are frequency scanned, camping is not performed on an ARFCN identified through the ARFCN table. Here, Public Land Mobile Network (PLMN) information, detected during the frequency scanning of all frequency bands, may be added to the ARFCN table.

As set forth above, according to the terminal and the control method thereof of exemplary embodiments of the present invention, which perform camping based on IMSI information, camping can be attempted without a scanning procedure for finding an available cell, thereby reducing an amount of time for camping.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which:

FIG. 1 is a table illustrating allocated frequency bands according to the conventional art;

FIG. 2 is a table illustrating allocatable Absolute Radio Frequency Channel Numbers (ARFCNs) according to the conventional art;

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 3:
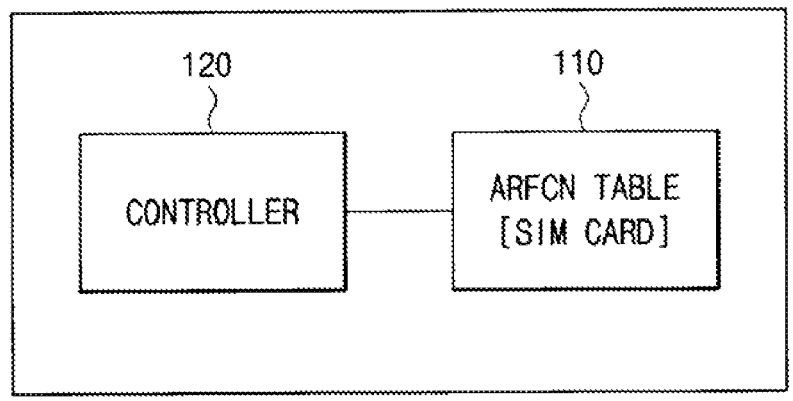
FIG. 3 is a functional block diagram illustrating a construction of a terminal, which performs camping based on International Mobile Subscriber Identity (IMSI) information, according to an exemplary embodiment of the present invention.

Hereinafter, a terminal, which performs camping based on International Mobile Subscriber Identity (IMSI) information, and a control method thereof according to exemplary embodiments of the present invention will be described with reference to the accompanying drawings FIG. 3 is a functional block diagram illustrating a construction of a terminal, which performs camping based on IMSI information, according to an exemplary embodiment of the present invention. The terminal may include an Absolute Radio Frequency Channel Number (AFRCN) table 110 and a controller 120.

The AFRCN table 110 may store at least one ARFCN information. More specifically, the ARFCN table 110 may be stored in a Subscriber Identity Module (SIM) card, and may identify IMSI information such as Mobile Country Code (MCC) information and Mobile Network Code (MNC) information.

When controlling a frequency scanning, the controller 120 may first detect ARFCNs from the ARFCN table 110, and may perform camping on a one of the detected ARFCNs. If camping is not performed after all the ARFCNs identified through the ARFCN table 110 are scanned, the controller 120 may perform frequency scanning of all frequency bands. Then, the controller 120 may add Public Land Mobile Network (PLMN) information, detected through the frequency scanning, to the ARFCN information of the ARFCN table 110.

The frequency scanning of the controller 120 may be performed when the terminal has acquired or is attempting to acquire mobile communication service after being powered on or moving into an area where the service is available from an area where mobile communication service is unavailable.

In describing functions and operations of the above-described components, general functions and detailed operations thereof are not described and only those essential to the concept of exemplary embodiments of the present invention will be described.

A terminal using a SIM card of a specific service provider can camp on only one ARFCN since the service provider generally uses one ARFCN. However, because of roaming contracts between service providers, the terminal can camp on several ARFCNs.

For example, there are four service providers in Frankfort, Germany, such as Voda (2112.8), E-Plus (2117.6), O2 (2157.2) and T-Mobile (2167.2).

TABLE 1

| MMC1 | MNC1-1 | ARFCN1 | ARFCN2 | ARFCN3 |
|------|--------|--------|--------|--------|
|      | MNC1-2 | ARFCN4 | ARFCN5 | ARFCN6 |
|      | MNC1-3 | ARFCN7 | ARFCN8 | ARFCN9 |
| MMC2 | MNC2-1 | ARFCN11 | ARFCN12 | ARFCN13 |
|      | MNC2-2 | ARFCN14 | ARFCN15 | ARFCN16 |
|      | MNC2-3 | ARFCN17 | ARFCN18 | ARFCN19 |
| MMC3 | MNC3-1 | ARFCN21 | ARFCN22 | ARFCN23 |
|      | MNC3-2 | ARFCN24 | ARFCN25 | ARFCN26 |
|      | MNC3-3 | ARFCN27 | ARFCN28 | ARFCN29 |

When a terminal having an ARFCN table 110, such as Table 1 above, stored in a SIM card (e.g., Voda) thereof is powered on, the controller 120 of the terminal identifies MCC and MNC registered in the SIM card. The above-described operation is performed when the terminal has acquired a mobile communication service by moving into an area where the service is available from another area where mobile communication service is unavailable.

Then, the controller 120 may identify "ARFCN1 (2112.8)" registered in the AFRCN table 110 based on the identified "MCC1" and "MNC1." If ARFCN identified through the ARFCN table 110 indicates a Home PLMN (HPLMN), normal camping may occur. In contrast, if the ARFCN indicates a Visited PLMN (VPLMN), limited camping may occur.

When the terminal fails to camp on "ARFCN1 (2112.8)" of Voda, the controller 120 may attempt limited camping on "ARFCN2 (2117.6)" of E-Plus and "ARFCN3 (2157.2)" of O2.

Accordingly, the controller 120 may not scan other frequencies, but may instead attempt to directly camp on "ARFCN1," identified from the ARFCN table 110.

If an ARFCN registered in the ARFCN table 110 is not camped on, the controller 120 may perform frequency scanning of all frequency bands, and may register PLMN information, detected by the frequency scanning of all the frequency bands, in the ARFCN table 110 as additional ARFCN information.

Now, a control method of the above-described terminal, which performs camping based on IMSI information, according to an exemplary embodiment of the present invention will be described with reference to FIG. 4.

Figure 4:
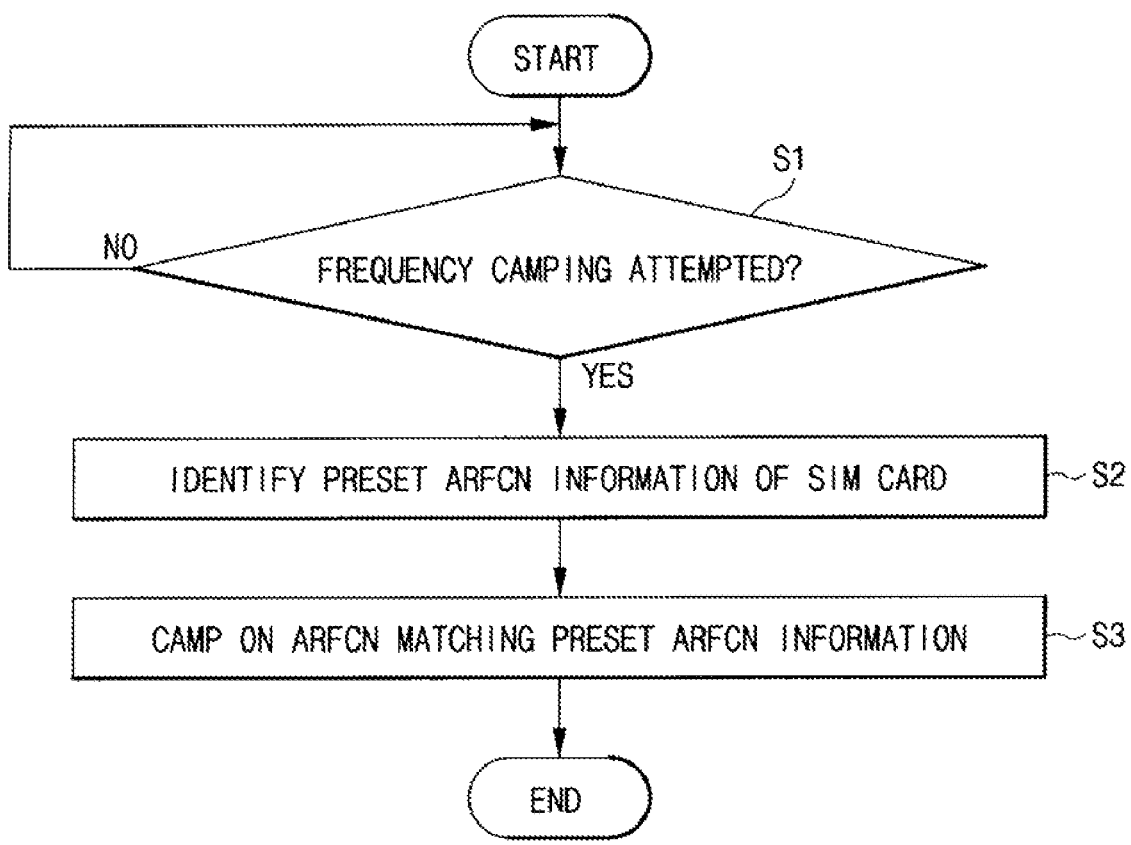
FIG. 4 is a flowchart of a control method of the terminal, which performs camping based on IMSI information, according to an exemplary embodiment of the present invention.

FIG. 4 is a flowchart of a control method of the terminal, which performs camping based on IMSI information, according to an exemplary embodiment of the present invention.

First, it may be determined whether frequency camping is attempted in step S1. More specifically, it may be determined in step S1 whether the terminal has acquired mobile communication service by being powered on or moving into an area where the service is available from another area where mobile communication service is unavailable.

If frequency camping is attempted, ARFCN information preset in the SIM card may be identified in step S2. The preset AFRCN information of the SIM card may be stored in the ARFCN table 110 of the SIM card, and may be identified based on MCC information and MNC information stored in the SIM card.

In step S2, when identifying the preset ARFCN information of the SIM card, HPLMN of the ARFCN information is first attempted to be camped on and then VPLMN may be attempted to be camped on.

Next, the ARFCN corresponding to the preset ARFCN information may be camped on in step S3.

According to the control method described above, when camping does not occur after all the ARFCNs, identified by the ARFCN table 110, are scanned, frequency scanning is performed of all frequency bands, and PLMN information, detected through the frequency scanning of all the frequency bands, may be added to the ARFCN table 110.

While the present invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A terminal comprising:
an Absolute Radio Frequency Channel Number (ARFCN) table including at least one ARFCN information; and
a controller for controlling a frequency scanning based on the ARFCN table to detect one or more ARFCNs from the ARFCN table and for controlling a camping on at least one of the detected one or more ARFCNs,
wherein the camping is performed based on International Mobile Subscriber Identity (IMSI) information,
wherein the camping on the at least one of the detected one or more ARFCNs comprises, if a Home Public Land Mobile Network (HPLMN) is detected, camping on the HPLMN,
wherein the controller controls frequency scanning of all the ARFCNs included in the ARFCN table, and if a camping does not occur on any ARFCN included in the ARFCN information, controls frequency scanning of all frequency bands, and
wherein the controller adds detected Public Land Mobile Network (PLMN) information as the ARFCN information of the ARFCN table after the frequency scanning of all the frequency bands.

2. The terminal according to claim 1, wherein the ARFCN table identifies the one or more ARFCNs based on at least one of Mobile Country Code (MCC) information and Mobile Network Code information stored in a Subscriber Identify Module (SIM) card.

3. The terminal according to claim 1, wherein the controller controls the frequency scanning when acquiring service after one of being powered on and moving into an area where the service is available from another area where the service is unavailable.

4. The terminal according to claim 1, wherein the camping on the at least one of the detected one or more ARFCNs comprises, if the HPLMN is not detected, camping on a Visited Public Land Mobile Network (VPLMN) if a VPLMN is detected.

5. The terminal according to claim 4, wherein the camping on the VPLMN is limited.

6. A method of controlling a terminal, which includes a Subscriber Identify Module (SIM) card, the method comprising:
determining whether frequency camping is attempted;
if it is determined that the frequency camping is attempted, identifying preset Absolute Radio Frequency Channel Number (ARFCN) information stored in a SIM card;
camping on at least one ARFCN corresponding to the preset ARFCN information;
performing frequency scanning of all frequency bands if, after all ARFCNs identified through an ARFCN table are frequency scanned, camping is not performed on an ARFCN identified through the ARFCN table; and
adding Public Land Mobile Network (PLMN) information, detected after the frequency scanning of all frequency bands, to the ARFCN table,
wherein the camping is performed based on International Mobile Subscriber Identity (WSJ) information, and
wherein the identifying of the preset ARFCN information stored in the SIM card comprises camping on a Home Public Land Mobile Network (HPLMN).

7. The method according to claim 6, wherein the determining of whether camping is attempted is performed when the terminal acquires service after one of being powered on and moving into an area where the service is available from another area where the service is unavailable.

8. The method according to claim 6, wherein the preset ARFCN information is included in an ARFCN table that is stored in the SIM card.

9. The method according to claim 6, wherein the identifying of the preset ARFCN information stored in the SIM card is performed based on at least one of Mobile Country Code (MCC) and Mobile Network Code (MNC) information.

10. The method according to claim 6, wherein the identifying of the preset ARFCN information stored in the SIM card comprises camping on a Visitor Public Land Mobile Network (VLPLMN) after camping on the HPLMN.

11. The method according to claim 10, wherein the camping on the VPLMN is limited.

* * * * *